United States Patent
Bertram et al.

(10) Patent No.: US 10,241,815 B2
(45) Date of Patent: Mar. 26, 2019

(54) TAG INHERITANCE

(71) Applicant: International Business Machines Corporation, Armonk, NY (US)

(72) Inventors: Randal L. Bertram, Raleigh, NC (US); Niraj D. Patel, Austin, TX (US); Aaron D. Sahlin, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 931 days.

(21) Appl. No.: 14/468,631

(22) Filed: Aug. 26, 2014

(65) Prior Publication Data

US 2016/0065489 A1 Mar. 3, 2016

(51) Int. Cl.
*G06F 9/50* (2006.01)
*G06F 9/445* (2018.01)
*G06F 9/455* (2018.01)
*H04L 12/911* (2013.01)

(52) U.S. Cl.
CPC ...... *G06F 9/45558* (2013.01); *G06F 9/44505* (2013.01); *G06F 9/45533* (2013.01); *G06F 9/5027* (2013.01); *H04L 47/821* (2013.01); *G06F 2009/4557* (2013.01)

(58) Field of Classification Search
CPC ............... H04L 67/2804; H04L 47/821; G06F 9/45558; G06F 9/5027; G06F 9/45533; G06F 2009/4557; G06F 17/30342; G06F 17/20038; G06F 17/30265; G06F 17/30268; G06F 3/0482; G06F 9/4558; G06F 9/44505; G06F 9/5017
USPC ........ 709/203, 204, 220, 226; 707/638, 723, 707/749, 778; 715/733; 348/305
See application file for complete search history.

(56) References Cited

U.S. PATENT DOCUMENTS

| | | | | |
|---|---|---|---|---|
| 7,577,722 | B1* | 8/2009 | Khandekar | G06F 9/45558 709/220 |
| 8,055,680 | B2* | 11/2011 | Weeden | H04L 63/101 707/781 |
| 8,095,929 | B1* | 1/2012 | Ji | G06F 9/4856 709/223 |
| 9,141,363 | B2* | 9/2015 | Walter | G06F 8/61 |
| 9,240,985 | B1* | 1/2016 | Potakamuri | H04L 63/08 |
| 9,286,491 | B2* | 3/2016 | Roth | G06F 21/6254 |
| 9,292,323 | B2* | 3/2016 | Suresh | G06F 9/4445 |
| 9,405,588 | B2* | 8/2016 | Stolyar | G06F 9/45558 |
| 2008/0189312 | A1* | 8/2008 | Taranov | G06F 17/30734 |

(Continued)

OTHER PUBLICATIONS

List of IBM Patents or Patent Applications Treated as Related.

*Primary Examiner* — James E Springer
(74) *Attorney, Agent, or Firm* — ZIP Group PLLC

(57) ABSTRACT

A data handling system includes a managing resource that manages one or more managed resources. The managed resource inherits tags of its managing resource(s). A user of the data handling system may apply tags to a managing resource via a management console. The tags may be applied via a user interface and utilized to organize the managed and managing resources. The tags may be typeless in that the user may assign any type of meaning to any tag. Tags assigned to the managing resource are applied or inherited to the resources it manages. The pattern of inheritance repeats through 'n' generations as managed resources, themselves, can be managing resources.

18 Claims, 9 Drawing Sheets

(56) References Cited

U.S. PATENT DOCUMENTS

| | | | | |
|---|---|---|---|---|
| 2008/0282198 | A1* | 11/2008 | Brooks | G06Q 10/10 715/854 |
| 2009/0182439 | A1* | 7/2009 | Birze | H04L 12/2854 700/3 |
| 2010/0162259 | A1* | 6/2010 | Koh | G06F 9/45558 718/104 |
| 2011/0225277 | A1* | 9/2011 | Freimuth | G06F 9/45558 709/223 |
| 2011/0296370 | A1* | 12/2011 | Ferris | G06F 9/44536 717/100 |
| 2011/0314014 | A1* | 12/2011 | Junginger | G06Q 10/00 707/736 |
| 2012/0110651 | A1* | 5/2012 | Van Biljon | G06Q 30/04 726/4 |
| 2012/0221561 | A1* | 8/2012 | Brown | G06F 17/30014 707/725 |
| 2013/0054601 | A1* | 2/2013 | Whitlock | G06F 17/30342 707/737 |
| 2013/0159910 | A1* | 6/2013 | Bostic | G06F 11/3048 715/772 |
| 2013/0212115 | A1* | 8/2013 | Yerli | G06F 17/30268 707/749 |
| 2013/0212576 | A1* | 8/2013 | Huang | G06F 9/45558 718/1 |
| 2014/0081969 | A1* | 3/2014 | Morris | G06F 17/30997 707/736 |
| 2014/0337413 | A1* | 11/2014 | Kamma | H04L 67/2804 709/203 |

* cited by examiner

TAG INHERITANCE

FIELD OF THE INVENTION

Embodiments of the invention generally relate to data handling systems and more particularly tagging of data handling systems and tagging of the resources thereof.

DESCRIPTION OF THE RELATED ART

When a computing workload is deployed in a cloud environment, it must be placed on computing resources that the cloud manages. For example, the workload may be hosted by a hypervisor, which may be managed by a virtualization manager, which in turn may be managed by the cloud.

In many instances the entirety of resources in the cloud environment is unknown. For example, managed resources may be unknown until after its manager is registered and inventory determined. Because of the scalability of cloud environment, such registration and inventory processes are not efficient in cloud environments including numerous resources. Therefore, what is needed is an efficient way to organize computing resources.

SUMMARY

In a first embodiment of the present invention, a method of organizing computing resources includes receiving, with a management console, a tag associated with a managing computing resource, determining, with the management console, a plurality of managed computing resources dependent upon and controlled by the managing computing resource, applying, with the management console, the received tag to the plurality of managed computing resources, and organizing, with the management console, the managing computing resource and the plurality of managed computing resources by displaying the received tag in association with a managing computing resource display object and by displaying the applied tags in association with a plurality of managed computing resource display objects.

In another embodiment of the present invention, a computer program product for organizing computing resources includes a computer readable storage medium having program instructions embodied therewith to cause a management console to receive a tag associated with a managing computing resource, determine a plurality of managed computing resources dependent upon and controlled by the managing computing resource, apply the received tag to the plurality of managed computing resources, and organize the managing computing resource and the plurality of managed computing resources by displaying the received tag in association with a managing computing resource display object and by displaying the applied tags in association with a plurality of managed computing resource display objects.

In yet another embodiment of the present invention a data handling environment includes a plurality of physical computing nodes communicatively interconnected that are controlled by a management console. Each respective physical computing node includes a hypervisor that implements a plurality of virtual machines that emulate one or more of the physical computing nodes. The management console also controls each respective hypervisor and is configured to receive a tag associated with a managing computing resource, determine a plurality of managed computing resources dependent upon and controlled by the managing computing resource, apply the received tag to the plurality of managed computing resources, and organize the managing computing resource and the plurality of managed computing resources by displaying the received tag in association with a managing computing resource display object and by displaying the applied tags in association with a plurality of managed computing resource display objects.

DETAILED DESCRIPTION

Figure 1:
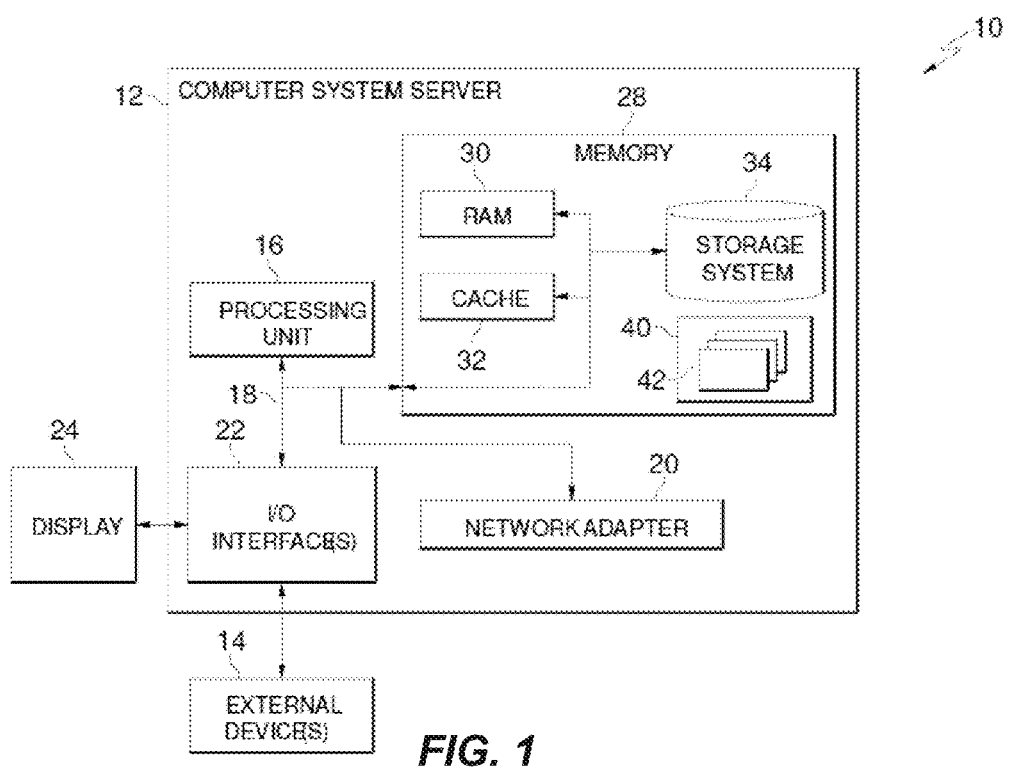
FIG. 1 depicts a cloud computing node according to an embodiment of the present invention.

Embodiments of the invention relate to a managed resource inheriting tags of a managing resource. In embodiments, a user applies tags to a managing resource (e.g., spare/stand-by server, cloud, virtual manager, hypervisor, virtual machine, etc.). The tags may be applied via a user interface and utilized to organize resources. The tags may be typeless in that the user assigns any type of meaning to any tag. Each tag applied to a managing resource is inherited by each managed resource. In other words, tags assigned to the managing resource are applied to the resources it manages. The pattern of direct inheritance repeats through 'n' generations as managed resources, themselves, can be managers.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
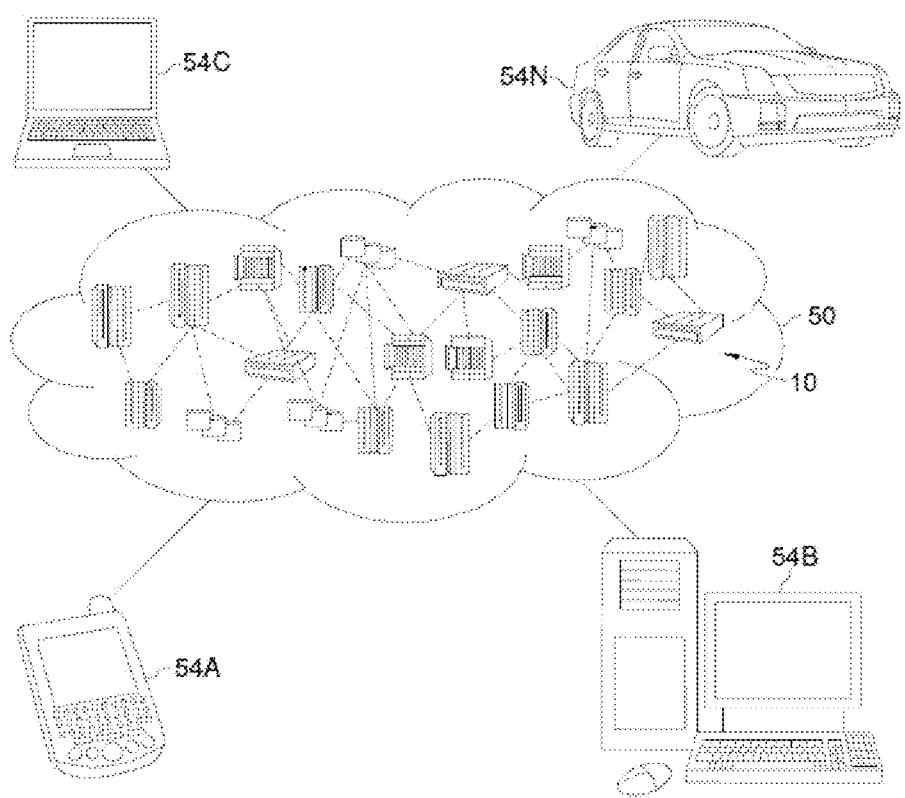
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
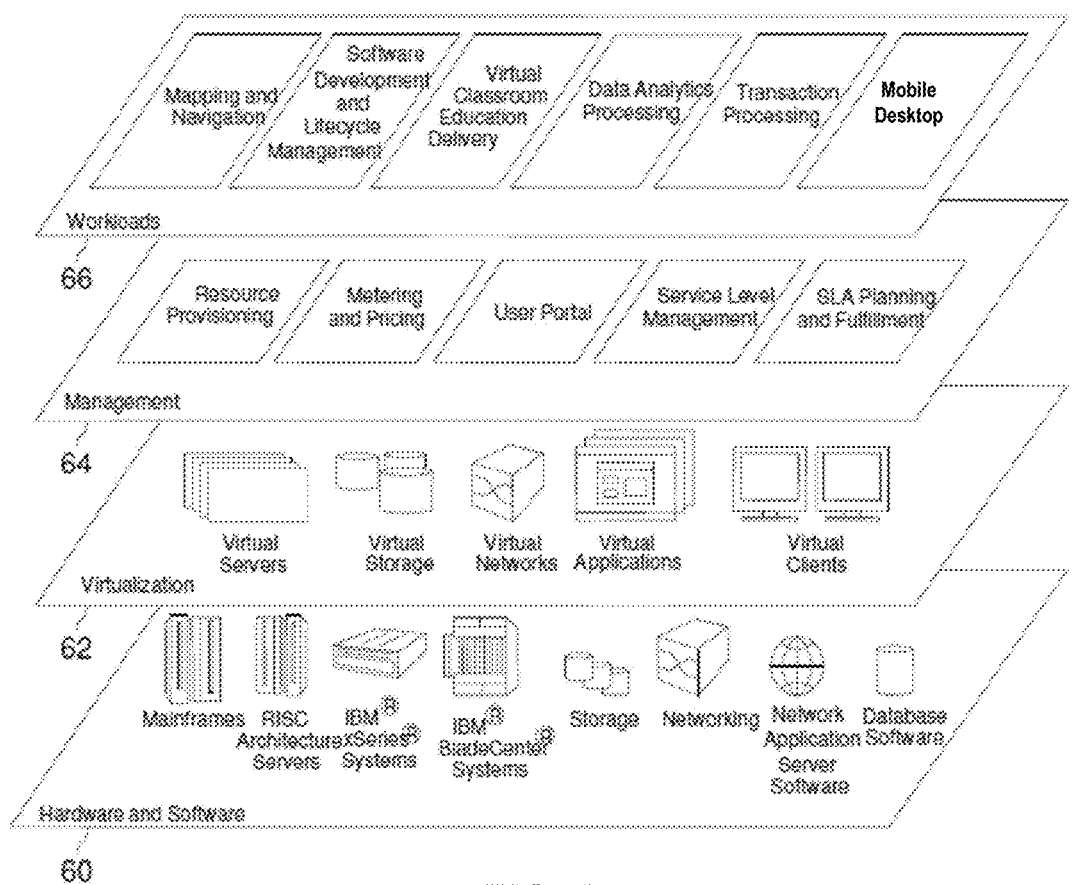
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; mobile desktop.

Figure 4:
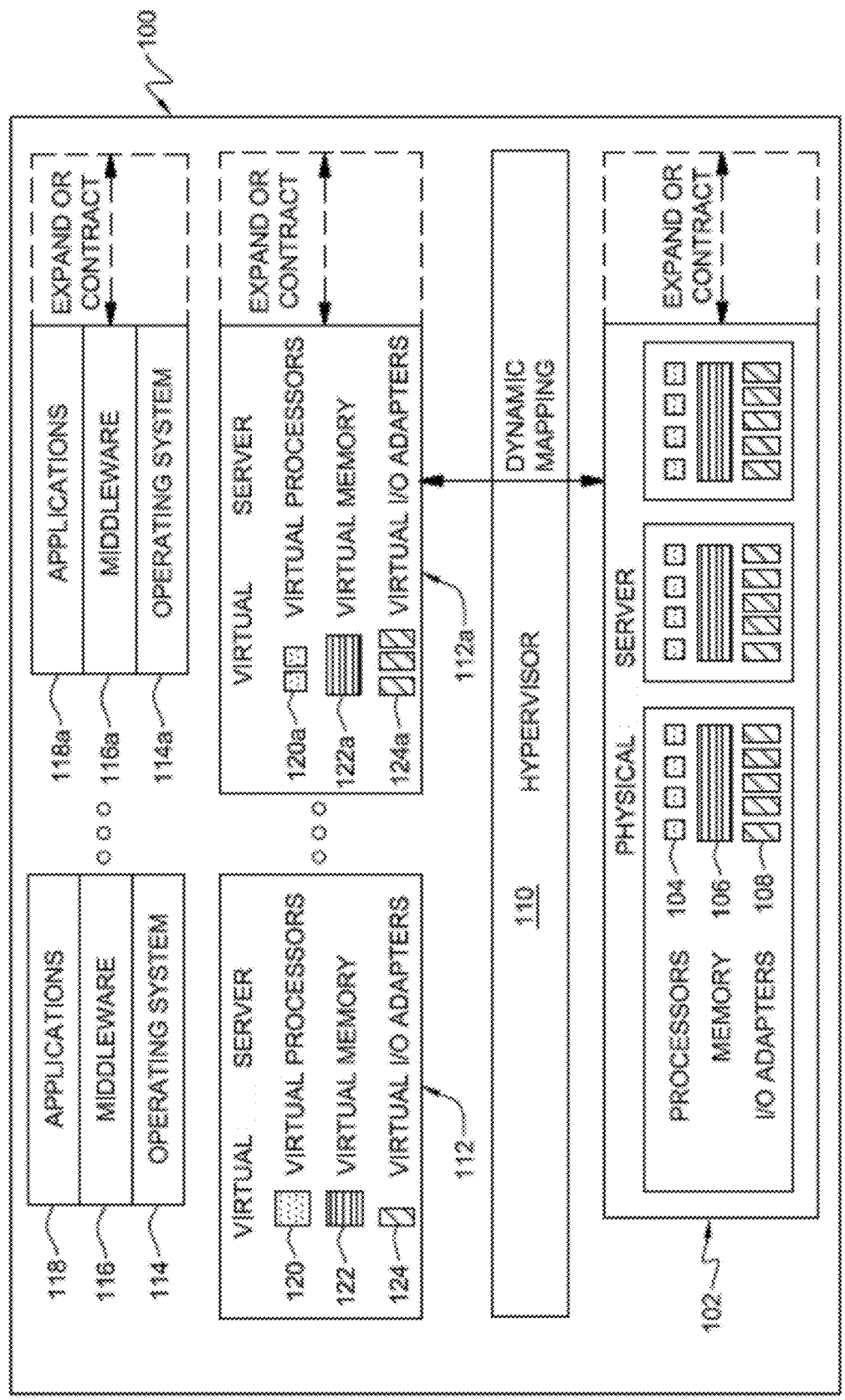
FIG. 4 is a block diagram of an exemplary data processing system to implement one or more embodiments of the present invention.

FIG. 4 is a block diagram of a data processing system 100, which in one example, is a multiprocessing server computer system, computing node 10, etc. System 100 includes physical hardware devices that can be mapped to, i.e., temporarily owned by, a user application to execute that application.

System 100 includes a physical computer system 102. Physical system 102 includes physical hardware devices such as processor 104, memory 106, and I/O adapters 108. These physical devices are managed by hypervisor 110. Processors 104 are shared processors and each may be a simultaneous multithreading capable processor that is capable of concurrently executing multiple different threads on the processor. Hypervisor 110 may also be referred to as a virtual machine manager, virtual machine monitor, managing partition, an operating system 114 within a dedicated virtual machine, etc. For example, the functionality of hypervisor 110 described herein may accomplished by e.g., a managing partition.

A virtual server is a proxy for a physical server that has the same capabilities, interfaces, and state. Virtual servers are created and managed by a hypervisor that resides on physical system 100. A virtual server appears to be a physical server to its user: the operating system, middleware, and application software that run upon it. System 100 includes one or more virtual servers such as virtual server 112.

Each virtual server appears to its software to include its own processor(s), memory, and I/O adapter(s) that are available for the exclusive use of that virtual server. For example, virtual server 112 includes a virtual processor 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, managing, and destroying virtual servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 5:
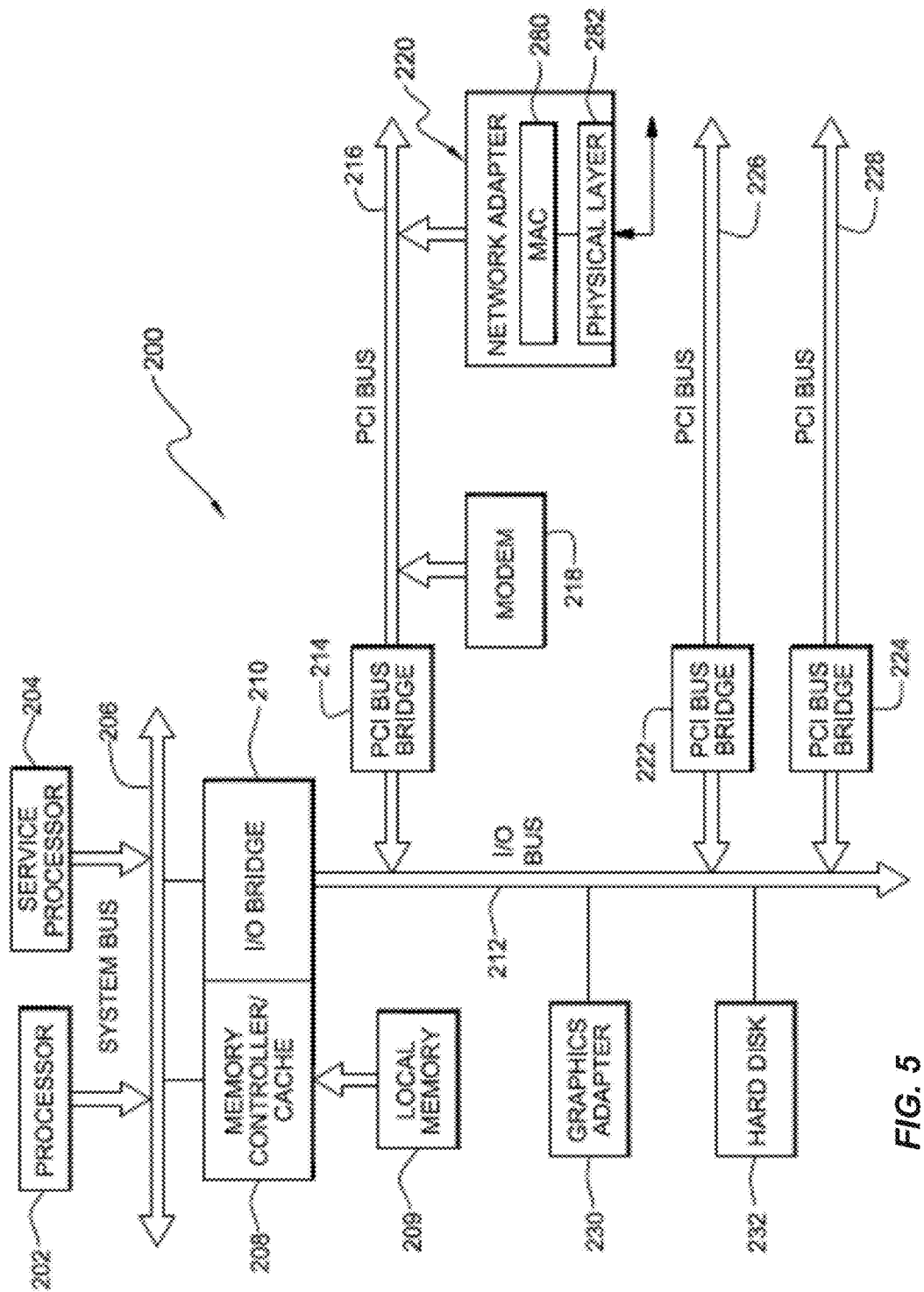
FIG. 5 is a more detailed illustration of a data processing system which could be used to implement one or more embodiments of the present invention.

FIG. 5 is a more detailed illustration of a computer system that may be used to implement the concepts described herein. Data processing system 200 may be a symmetric multiprocessor system including a plurality of shared processors or multi treading capable processors, such as processors 202 and 204 connected to system bus 206. Alternatively, a single processor system may be employed. In the depicted example, processor 204 is a service processor. Each processor may be capable of concurrently executing multiple hardware threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers may be provided through modem 218 and network adapter 220 connected to PCI local bus 216 through add-in boards.

Network adapter 220 includes a physical layer 282 which conditions analog signals to go out to the network, such as for example, an Ethernet network for an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 5 may vary. For example, other peripheral devices, such as optical disk drives and the like, also may be used in addition to or in place of the hardware depicted. The depicted example is not meant to imply architectural limitations with respect to the present invention.

The present invention may be executed within one of the computers or data processing systems depicted in FIG. 4, FIG. 5, etc. As a specific, commercially available example, a shared memory partition data processing system implementing hypervisor-managed paging such as described herein below can be built upon technologies found in IBM's p/i Series product line firmware and systemware, as described in the "Power Architecture Platform Reference" (PAPR) material Version 2.7, 9 Oct. 2007, which is hereby incorporated herein by reference. In addition, a virtual input/output server (VIOS) is commercially available as part of a PowerVM™ computing system offered by International Business Machines Corporation™. The VIOS allows sharing of physical resources between logical partitions, including virtual SCSI and virtual networking. This allows more efficient utilization of physical resources through sharing between logical partitions and facilitates server consolidation. For clarity, the shared memory partition is generally a partition or virtual machine sharing memory space (e.g., DRAM memory, FLASH memory, disk drive memory, etc.) with a distinct partition or virtual machine.

Figure 6:
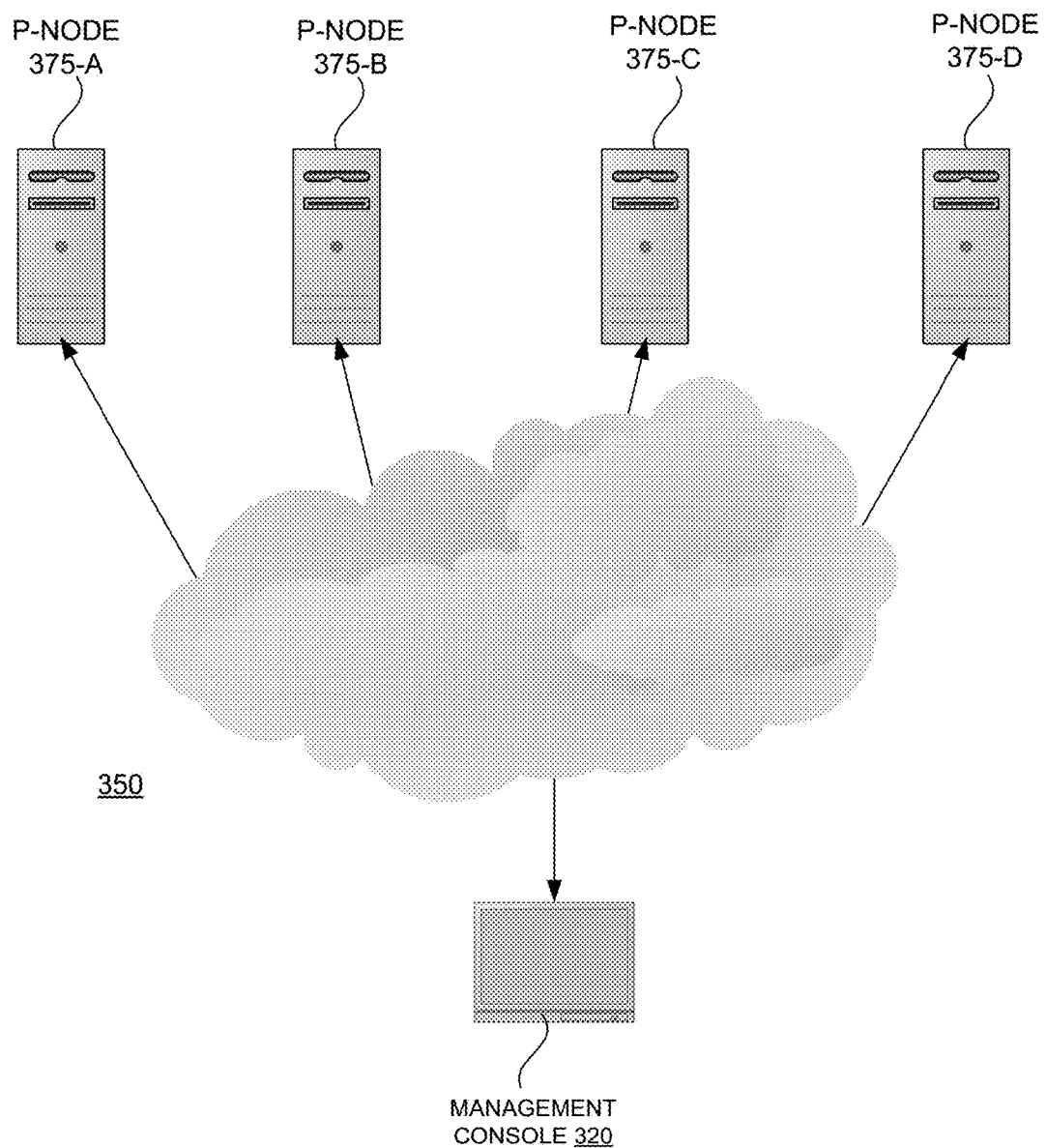
FIG. 6 illustrates an exemplary cloud environment, in accordance with embodiments of the present invention.

FIG. 6 illustrates an exemplary cloud environment 350 (e.g. IaaS cloud, etc.) that includes a management console 320 and multiple physical nodes 375, which may be example, multiprocessing server computer systems, computing nodes 10, data processing systems 100, etc. Each node 375 within cloud environment 350 includes a physical system including physical hardware devices such as processor, memory, hard drive, I/O adapters, etc. A hypervisor may deploy numerous virtual machines that are proxies for a physical system (the physical node hosting the hypervisor, an emulated node, etc.). The virtual machines are created and managed by a hypervisor that resides on each node 375 within the cloud environment 350.

Each hypervisor hosted by respective nodes 375 may be managed by management console 320 that includes an interface for configuring and operating the numerous nodes and/or virtual machines. Management console may be a data handling device, such as node 10, etc. Using the management console 320, a system administrator is able to manage the software configuration and operation of each virtual machine hosted by one or more nodes 375, manage the node 375, etc. In this manner, management console 320 may be considered a managing resource and the node 375 may be considered a managed resource.

A virtual machine (e.g. virtual server, virtual computer, etc.) appears to be a physical machine to its user. For example, each virtual machine appears to its software to include its own processor(s), memory, and I/O adapter(s) that are available for the exclusive use of that virtual machine. Each virtual machine supports its own software environment, including an operating system, middleware, and applications. The software environment of each virtual machine can be different from the software environment of other virtual machines. For example, the operating systems executed by each virtual machine may differ from one another. The hypervisor manages the mapping between the virtual machine with their virtual processors, virtual memory, virtual disk, virtual I/O adapters to the associated physical hardware resources of the host node.

Each hypervisor is responsible for dynamically creating, managing, and destroying virtual machines. As such, the hypervisor may be considered a managing resource and each respective virtual machine may be considered a managed resource. In embodiments, the hypervisor may deploy virtual machines based upon a particular virtual machine image amongst a plurality of various virtual machine images. The various images may be stored within each node or within management console 320 or are otherwise assessable by each local hypervisor. Upon the hypervisor deploying virtual machines from associated images, each virtual machine is unique relative to other virtual machines and typically includes distinct MAC addresses and/or other virtual machine identifiers. Deploying multiple virtual machines from a single image may be useful when numerous identical virtual machines would be beneficial. For example, a virtual machine may be deployed for each employee of an organization wherein each virtual machine includes a suite of preconfigured office applications. Further, the image can be configured with a complete development environment and then cloned repeatedly as a baseline configuration for software testing. Even further, an education institution can deploy a virtual machine for each student, with all the lessons and labs required for the term. In other words, by deploying virtual machines, one may conveniently make complete copies of a virtual machine image. In embodiments, the virtual machines deployed by hypervisor may be a Full Clone of a particular virtual machine image or a Linked Clone of a particular virtual machine image.

Figure 7A:
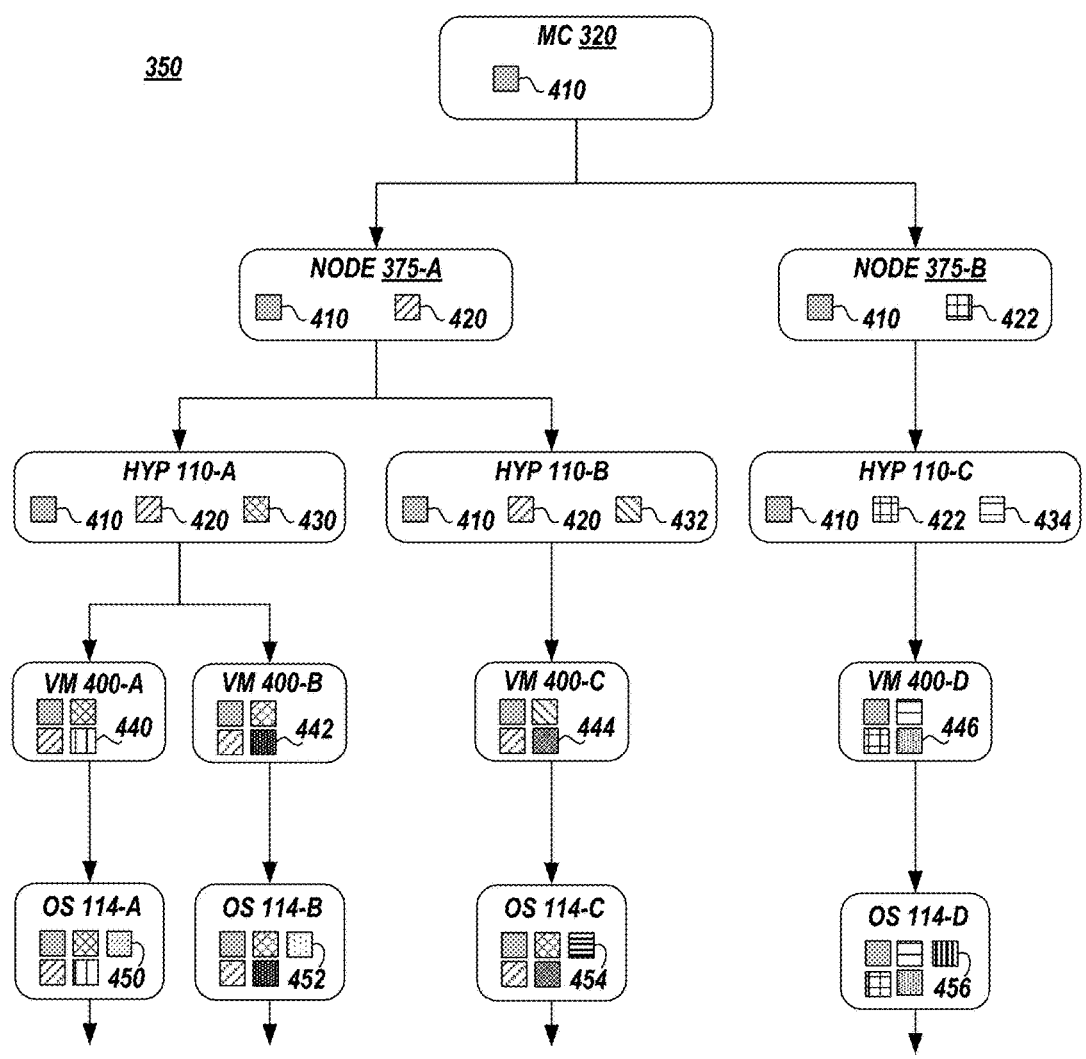
FIG. 7A-FIG. 7B illustrate various computing resources within a cloud environment, in accordance with embodiments of the present invention.
Figure 7B:
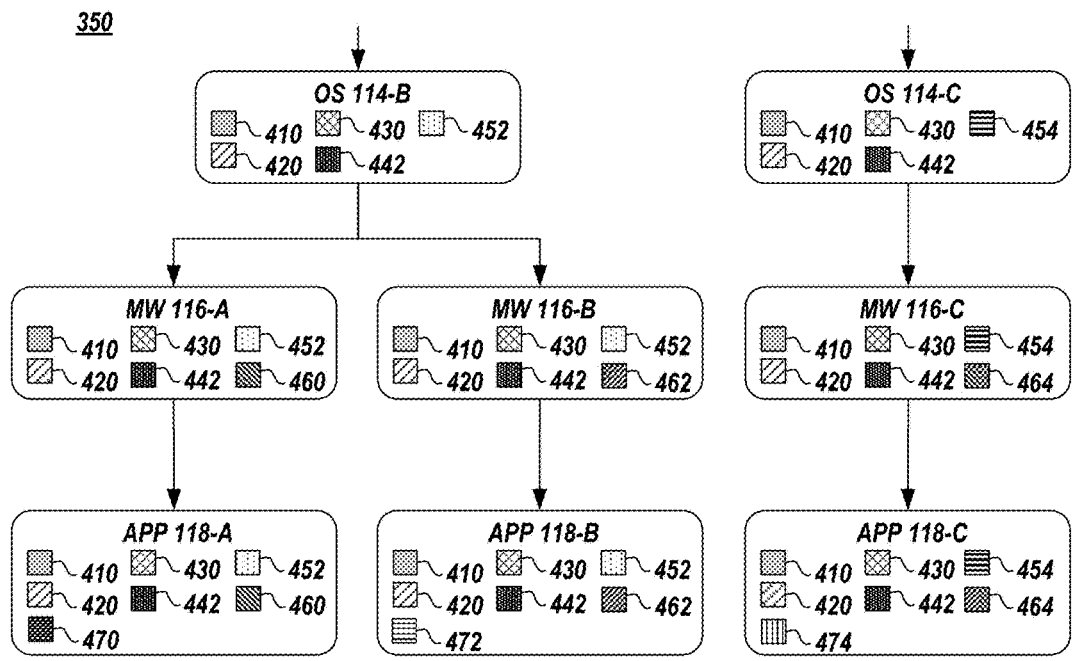

FIG. 7A-FIG. 7B illustrate exemplary computing resources within cloud environment 350. A resource may be a managing resource, which manages, controls, or other wise provides information to a managed resource. A managed resource is managed, controlled, or is otherwise dependent upon information provided by the managing resource. The managed resource may utilize the information provided by the managing resource to operate or implement workload consistent therewith. In embodiments, a particular managed resource may also manage one or more other resources.

As exemplary shown in FIG. 7A, management console 320 may manage node 375A and manage node 375B. Node 375A may manage hypervisor 110A and manage hypervisor 11B. Node 375B may manage hypervisor 110C. Hypervisor 110A may manage a first virtual machine 400A and may manage a second virtual machine 400B. Hypervisor 110B may manage a virtual machine 400C and hypervisor 110C may manage a virtual machine 400D. Virtual machine 400A may manage or implement an operating system 114A, virtual machine 400B may manage or implement an operating system 114B, virtual machine 400C may manage or implement an operating system 114C, and virtual machine 400D may manage or implement an operating system 114D.

As exemplary shown in FIG. 7B, operating system 114B may manage or implement middleware 116A and manage or implement middleware 116B. Operating system 114C may manage or implement middleware 116C. Operating system 114B may further manage or implement applications 118A that are dependent upon middleware 116A and may manage or implement applications 118B that are dependent upon middleware 116B. Finally, operating system 114C may manage or implement applications 118C that are dependent upon middleware 116C.

In embodiments, management console 320, nodes 375A, 375B, hypervisors 110A, 110B, 110C, virtual machines 400A, 400B, 400C, 400D, operating systems 114A, 114B, 114C, 114D, middleware 116A, 116B, 116C, and applications 118A, 118B, 118C are examples of computing resources. Some of these resources are managing resources (e.g. management console 320, hypervisor 110A, virtual machine 400B, etc.). Some of these resources are managing resources and managed resources (e.g. hypervisor 110A, etc.). Some of these resources are managed resources (e.g. middleware 116B, applications 116C, etc.).

In embodiments, a tag is applied to a managing resource and inherited by respective managed resources. Such tags may be utilized to efficiently organize the computing resources within cloud 350. In this paper, "tag" is a keyword or term assigned to a respective computing resource. The tag may be a form of metadata (i.e. metatag) that describes the resource and may be utilized in a browsing, searching, or management application. For example, metatags may be displayed in association with a resource upon the management console 320. Tags are typeless in that they may be assigned to the resource without the resource or the managing resource knowing the context or meaning of the tag. Tags may describe or define some aspect of the resource and may take the form of words, images, or other identifying marks.

In embodiments, tag 410 may be applied to management console 320 and inherited by nodes 375A, 375B, hypervisors 110A, 110B, 110C, virtual machines 400A, 400B, 400C, 400D, operating systems 114A, 114B, 114C, 114D, middleware 116A, 116B, 116C, and applications 118A, 118B, 118C. In other words, tag 410 is applied to management console and inherited by each managed resource. Tag 410 may, for example, describe or identify management console 410.

Tag 420 may be applied to node 375A and inherited by managed resources: hypervisor 110A, 110B, virtual machines 400A, 400B, 400C, operating systems 114A, 114B, 114C, middleware 116A, 116B, and applications 118A, 118B. Tag 420 may, for example, describe or identify node 375A. Tag 422 may be applied to node 375B and inherited by managed resources: hypervisor 110C, virtual machine 400D, and operating system 114D. Tag 422 may, for example, describe procedures, lessons learned, and facts that are related to node 375B.

Tag 430 may be applied to hypervisor 110A and inherited by managed resources: virtual machine 400A, 400B, operating system 114A, 114B, middleware 116A, 116B, and applications 118A, 118B. Likewise, tag 432 may be applied to hypervisor 110B and inherited by managed resources: virtual machine 400C, operating system 114C, middleware 116C, and applications 118C. Further, tag 434 may be applied to hypervisor 110C and inherited by managed resources: virtual machine 400DC, and operating system 114D. Tags 430, 432, 434 may, for example, be subjective information related to facts, procedures, concepts, interpretations, ideas, observations and judgments of hypervisor 110A, 110B, 110C, respectively.

Tag 440 may be applied to virtual machine 400A and inherited by managed resource operating system 114A. Tag 442 may be applied to virtual machine 400B and inherited by managed resources: operating system 114B, middleware 116A, 116B, and applications 118A, 118B. Tag 444 may be applied to virtual machine 400C and inherited by managed resources: operating system 114C, middleware 116C, and application 118C. Tag 446 may be applied to virtual machine 400D and inherited by managed resource operating system 114D. Tags 440, 442, 444, 446 may, for example, be objective information related to the assigned beneficiary of workload performed by virtual machines 400A, 400B, 400C, and 400D, respectively.

Tag 450 may be applied to operating system 114A and inherited by managed resources. Likewise, tag 452 may be applied to operating system 114B and inherited by managed resources: middleware 116A, 116B, and applications 118A, 118B. Tag 454 may be applied to operating system 114C and inherited by managed resources: middleware 116C and applications 118C. Tag 456 may be applied to operating system 114D and inherited by managed resources. Tags 450, 452, 454, 456 may, for example, be identifying information related to the type or release level of operating systems 114A, 114B, 114C, and 114D, respectively.

Tag 460 may be applied to middleware 116A and be inherited by managed resource: applications 118A. Tag 462 may be applied to middleware 116B and be inherited by managed resource: applications 118B. Tag 464 may be applied to middleware 116C and be inherited by managed resource: applications 118C. Tags 460, 462, 464 may identify suite release level related to one or more middleware components of middleware 116A, 116B, and 116C, respectively.

Tag 470, 472, 474 may be applied to applications 118A, 118B, 118C and be inherited by managed resources, respectively. Tags 470, 472, 474 may identify usage levels associated with one or more application components of applications 118A, 118B, and 118C, respectively.

In embodiments, tags may be applied by a user via a user interface associated with the managing resource. In other embodiments, upon deployment within cloud environment 350, the managing resource may self apply one or more tags. For example, the managing resource may self apply an identifier tag such as a GUID, etc. In embodiments, the applied tags and inherited tags may be displayed upon a user interface associated with one or more managing resources.

Figure 8:
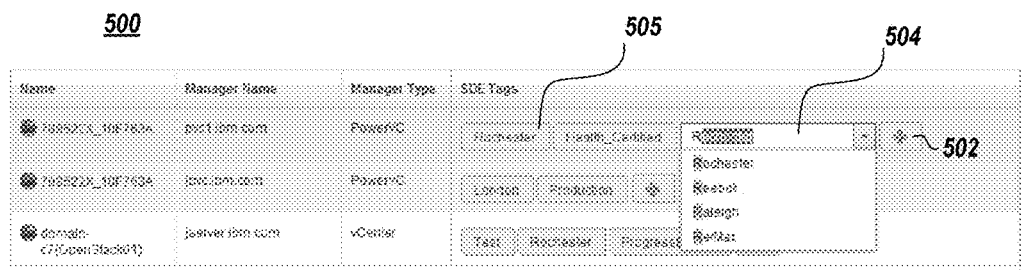
FIG. 8 illustrates an exemplary graphic user interface for receiving tags, in accordance with embodiments of the present invention.

For example, in FIG. 8 an exemplary graphic user interface 500 for receiving or applying tags is shown. In certain embodiments, user interface 500 may be utilized in a cloud management application for managing or organizing various resources within cloud environment 350. User interface 500 may be displayed upon management console 320 and may include various row entries listing various resources. For example, a managed resource "789522X_10F763A" and a managed resource "domain-c7" are displayed. User interface 500 may also display associated manager resources. For example, multiple row entries for managed resource "789522X_10F763A" may be included since such resource is managed by manager resource "pvc1.ibm.com" and by "jpvc.ibm.com," respectively. User interface 500 may further display associated tags that have been received and applied or otherwise associated with a managed resource. For example, tags "Rochester" and "Health_Certified" are displayed within the top 789522X_10F763A" row after having been received and applied to 789522X_10F763A."

User interface 500 may further include one or more tag entry fields 504 that may be utilized by a user to input one or more tags. Tag entry field 504 may be a free form text entry object. For example, a user may add tag "Repository" by typing such tag into tag entry filed. The tag entry field 504 may display related tags in a drop down as shown in FIG. 8, as the user is typing the tag to be assigned. In certain embodiments, the tag entry field 504 may be displayed upon the user engaging tag add object 502. Interface 500 may also include a tag object 505 that displays tags applied to a managing resource. In embodiments, tag object 505 may be engaged and a subsequent interface (e.g. interface 540, etc.) may be displayed that depicts managed resources that inherited the tag associated with the tag object 505.

Figures 9, 10, 11, 12:
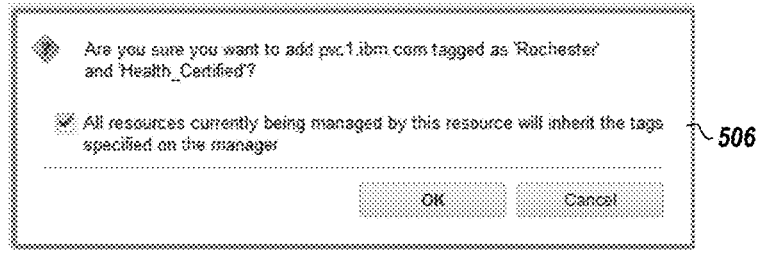
FIG. 9 illustrates an exemplary graphic user interface to confirm the deployment of a computing resource that has been tagged, in accordance with embodiments of the present invention.
FIG. 10 and FIG. 11 illustrate exemplary managing resource graphic user interfaces including a resource tag quantity inheritance object, in accordance with embodiments of the present invention.
FIG. 12 illustrates an exemplary managed resource graphic user interface that includes a resource tag object that displays an inherited tag, in accordance with embodiments of the present invention.

As shown in FIG. 9, user interface 500 may include an object 506 to confirm the deployment of a computing resource that has been tagged, in accordance with embodiments of the present invention. For example, confirmation object 506 may be displayed to prompt the user of interface 500 to confirm the resource "pvc.1.ibm.com" should be added or deployed within cloud environment 350. Confirmation object 506 may include the applied tags associated with the resource. For example, object 506 displays that resource "pvc.1.ibm.com" has been tagged with "Rochester" and "Health_Certified." Further, user interface 500 may include an option to activate or deactivate tag inheritance functionality. For example, object 506 may include an option to enable tag inheritance so that all resources currently managed by resource "pvc.1.ibm.com" will inherit tags "Rochester" and "Health_Certified."

FIG. 10 and FIG. 11 illustrate an exemplary managing resource graphic user interface 520. Interface 520 includes a resource tag inheritance quantity object 522 that is indicative of the number of managed resources that have inherited a tag or tags applied to the managing resource. Object 522 may be a gauge icon that generally is able to inform the user of the interface 520 of the respective quantity of managed resources that have inherited a tag applied to an associated managing resource. For example, as shown in FIG. 10, a managing resource "pvc1.ibm.com" has had a tag applied thereto that has been inherited by its managed resources. Object 522 displays a full status indicating that all of the managed resources that have inherited the tag have retained the tag. In other words, the tag(s) inherited by the managed resources of "pvc1.ibm.com" have not been removed from the managed resources. In embodiments, a user may engage the interface 520 using a touch gesture 524, cursor, etc. In embodiments, a hover object 526 is displayed if object 522 is engaged. Hover object 526 may include information regarding the quantity of managed resources that have inherited a tag or tags applied to an associated managing resource. For example, managing resource "pvc1.ibm.com" has had a tag or tags applied thereto that have been inherited by two managed resources. When hover object 526 is displayed, it includes that two managed resources have inherited a tag or tags applied to resource "pvc1.ibm.com" and that neither of the two managed resources have had the tag or tags removed therefrom. Further, as shown in FIG. 11, managing resource "pvc2.ibm.com" has had a tag or tags applied thereto that have been inherited by ten managed resources. When hover object 526 is displayed, it includes that ten managed resources have inherited a tag or tags applied to resource "pvc2.ibm.com" and that one of the ten managed resources have had the tag or tags removed therefrom.

FIG. 12 illustrates an exemplary managed resource graphic user interface 540 that includes a resource tag object 542 that displays an inherited tag. Tag object 542 displays tags inherited by an associated managed resource. In embodiments inherited tag object 542 differs visually from applied tag object 505 so that a user of interface 540 may be informed of the tags that have been applied and tags that have been inherited to an associated resource. For example, as shown in FIG. 12, two managed resources have both inherited "Rochester" tags. In embodiments tag object 542 may be a different color, font, etc. relative to tag object 505. Alternatively, as shown in FIG. 12, tag object 542 may include an additional character, such as an "*" adjacent to the inherited tag.

Figure 13:
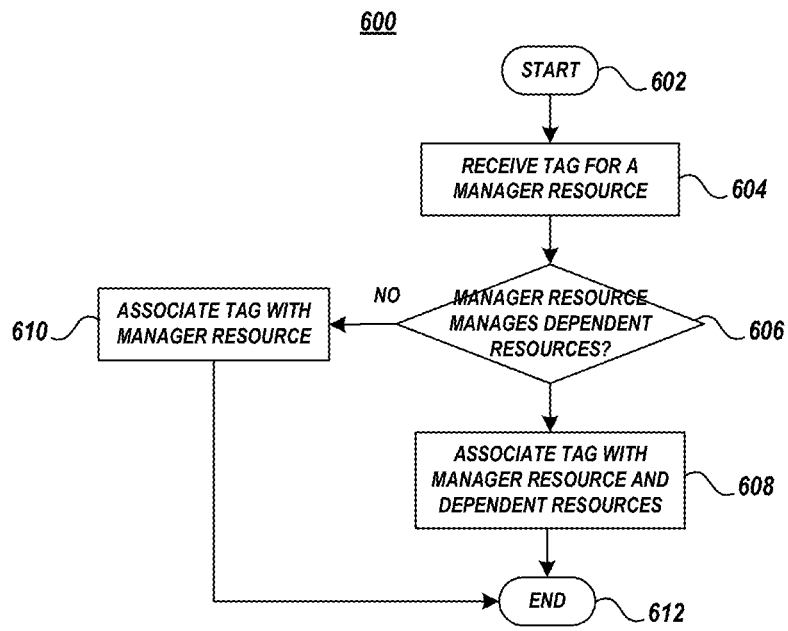
FIG. 13 illustrates an exemplary method of inheriting tags within a cloud environment, in accordance with embodiments of the present invention.

FIG. 13 illustrates an exemplary method 600 of inheriting tags within cloud environment. Method 600 may be utilized by management console 320 to manage the resources within cloud environment 350. Method 600 begins at block 602 and continues with a tag being associated with a resource within the cloud organization application (block 604). For example, one or more tags may be applied to a managing resource or received by each managed resource that may be dependent upon the managing resource.

Method 600 may continue by the management console 320 determining if associated resource manages managed resources (block 606). For example, the management console 320 may query the cloud environment application to determine managing and manager device relationship information. If the associated resource does not manage other resources the tag is associated or otherwise applied thereto (block 610). If the associated resource does manage other resources, the received tag is associated with the managed resources (block 608). Method 600 ends at block 612.

Figure 14:
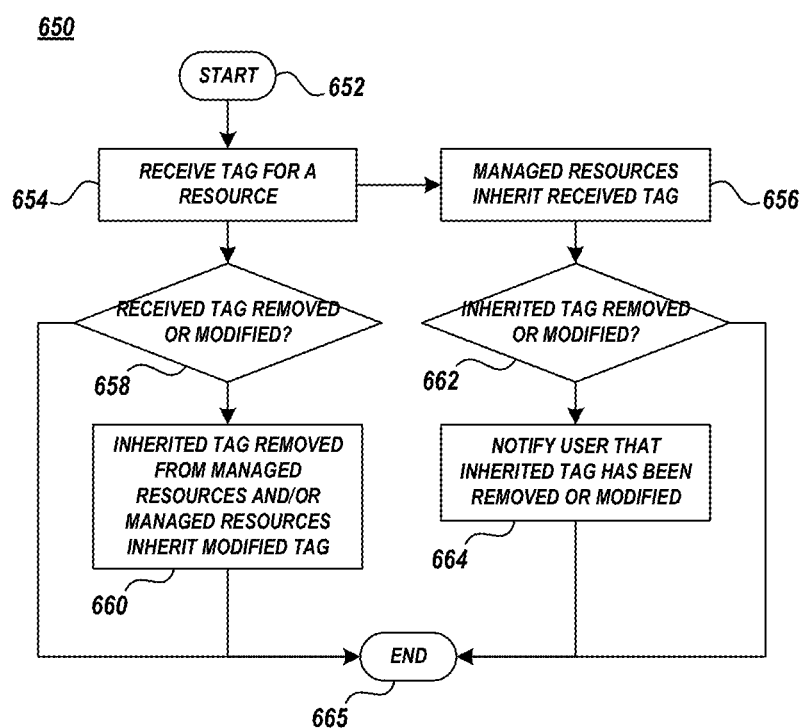
FIG. 14 illustrates an exemplary method of removing or modifying tags within cloud environment, in accordance with embodiments of the present invention.

FIG. 14 illustrates an exemplary method 650 removing or modifying tags within cloud environment. Method 650 may be utilized by management console 320 to manage the resources within cloud environment 350. Method 650 beings at block 652 and continues with a resource within cloud environment 350 receiving a tag (block 654). For example, one or more tags may be applied to a managing resource by user input into a cloud management application.

Method 650 may continue with management console 320 sending the received tag to each resource managed by the resource associated with the received tag (block 656). In this manner each managed resource may inherit the received tag. Method 650 may continue by the management console 320 determining if the inherited tag has been modified or removed (block 662). For example, a user of management console 320 may edit, remove, delete, etc. an inherited tag associated with a managed resource. Method 650 may continue with notifying that the inherited tag has been removed or modified in association with the managed resource (block 664). For example, in a user interface of the manage console 320 associated with the managing device for which the received tag was applied, a resource tag inheritance quantity object 522 may be displayed.

Method 650 may continue with management console 320 determining whether the received tag is removed or modified (block 658). For example, the user of management console 320 may edit, remove, delete, etc. the received tag. If the received tag is modified or removed, the associated inherited tag or tags are modified or removed accordingly (block 660). For example, if the user of management console deletes the tag "Rochester" and adds the tag "Raleigh," each associated inherited "Rochester" tag is removed and a "Raleigh" tag is inherited from appropriate managed resources. Method 650 ends at block 665.

Embodiments of the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A computer program product for organizing computing resources, the computer program product comprising a computer readable storage medium having program instructions embodied therewith, the program instructions readable to cause a management console to:
   display a tag entry field within a graphical user interface and receive a tag associated with a managing computing resource there within, the tag comprising a typeless keyword that describes the managing computing resource;
   determine a plurality of managed computing resources dependent upon and controlled by the managing computing resource;
   apply the received tag to all the plurality of managed computing resources dependent upon and controlled by the managing computing resource;
   display a managing computing resource display object within the graphic user interface, the managing computing resource display object comprising a first visual representation of the received tag;
   display a plurality of managed computing resource display objects within the graphic user interface, each managed computing resource display object comprising a second visual representation of the applied tag, wherein the first visual representation of the received tag is visually distinct from the second visual representation of the applied tag; and
   receive a user engagement of the managing computing resource display object and resultantly determine whether the received tag applied to all the plurality of managed computing resources have been subsequently removed from one or more of the plurality of managed computing resources; and display within a hover object within the graphic user interface a first quantity of managed computing resources dependent upon and controlled by the managing computing resource that which the received tag was applied and has not been subsequently removed therefrom and a second quantity of managed computing resources dependent upon and controlled by the managing computing resource that which the received tag was applied and has been subsequently removed therefrom.

2. The computer program product of claim 1, wherein the plurality of managed computing resources comprises a first managed computing resource directly managed by the managing computing resource and a second managed computing resource directly managed by the first managed computing resource.

3. The computer program product of claim 2, wherein the managing computing resource is a physical computing node, the first managed computing resource is a hypervisor hosted by the physical computing node, and the second managed computing resource is a virtual machine hosted by the hypervisor.

4. The computer program product of claim 2, wherein the managing computing resource is a virtual machine hosted upon a physical computing node, the first managed computing resource is an operating system hosted by the virtual machine and stored upon the physical computing node, and the second managed computing resource are application program instructions called by the operating system and stored upon the physical computing node.

5. The computer program product of claim 1, wherein the program instructions further cause the management console to:
   receive a user engagement of a particular managed computing resource display object; and
   display a grouping of all of the plurality of managed computing resource display objects associated with the plurality of managed computing resources that which the tag was applied.

6. The computer program product of claim 1, wherein the receive tag and the applied tags are metatags.

7. The computer program product of claim 1, wherein the first visual representation of the received tag is displayed with a different font relative to the second visual representation of the applied tag.

8. The computer program product of claim 1, wherein the first visual representation of the received tag is displayed with a different color relative to the second visual representation of the applied tag.

9. The computer program product of claim 1, wherein the first visual representation of the received tag includes an added character relative to the second visual representation of the applied tag.

10. A data handling network comprising:
    a plurality of physical computing nodes communicatively interconnected and each respectively comprising a hypervisor that implements a plurality of virtual machines that emulate one or more of the physical computing nodes;
    a management console that controls the plurality of physical computing nodes and each respective hypervisor, the management console configured to:
    display a tag entry field within a graphical user interface and receive a tag associated with a managing computing resource there within, the tag comprising a typeless keyword that describes the managing computing resource,
    determine a plurality of managed computing resources dependent upon and controlled by the managing computing resource,
    apply the received tag to all the plurality of managed computing resources dependent upon and controlled by the managing computing resource,
    display a managing computing resource display object within the graphic user interface of the management console, the managing computing resource display object comprising a first visual representation of the received tag,
    display a plurality of managed computing resource display objects within the graphic user interface of the management console, each managed computing resource display object comprising a second visual representation of the applied tag, wherein the first visual representation of the received tag is visually distinct from the second visual representation of the applied tag, and
    receive a user engagement of the managing computing resource display object and resultantly determine whether the received tag applied to all the plurality of managed computing resources have been subsequently removed from one or more of the plurality of managed computing resources; and display within a hover object within the graphic user interface of the management console a first quantity of managed computing resources dependent upon and controlled by the managing computing resource that which the received tag was applied and has not been subsequently removed therefrom and a second quantity of managed computing resources dependent upon and controlled by the managing computing resource that which the received tag was applied and has been subsequently removed therefrom.

11. The data handling network of claim 10, wherein the plurality of managed computing resources comprises a first managed computing resource directly managed by the managing computing resource and a second managed computing resource directly managed by the first managed computing resource.

12. The data handling network of claim 10, wherein the managing computing resource is a physical computing node, the first managed computing resource is a hypervisor hosted by the physical computing node, and the second managed computing resource is a virtual machine hosted by the hypervisor.

13. The data handling network of claim 10, wherein the managing computing resource is a virtual machine hosted upon a physical computing node, the first managed computing resource is an operating system hosted by the virtual machine and stored upon the physical computing node, and the second managed computing resource are application program instructions called by the operating system and stored upon the physical computing node.

14. The data handling network of claim 10, wherein the management console is further configured to:
    receive a user engagement of a particular managed computing resource display object, and
    display a grouping of all of the plurality of managed computing resource display objects associated with the plurality of managed computing resources that which the tag was applied.

15. The data handling network of claim 10, wherein the receive tag and the applied tags are metatags.

16. The data handling network of claim 10, wherein the first visual representation of the received tag is displayed with a different font relative to the second visual representation of the applied tag.

17. The data handling network of claim 10, wherein the first visual representation of the received tag is displayed with a different color relative to the second visual representation of the applied tag.

18. The data handling network of claim 10, wherein the first visual representation of the received tag includes an added character relative to the second visual representation of the applied tag.

* * * * *